Figure 1:
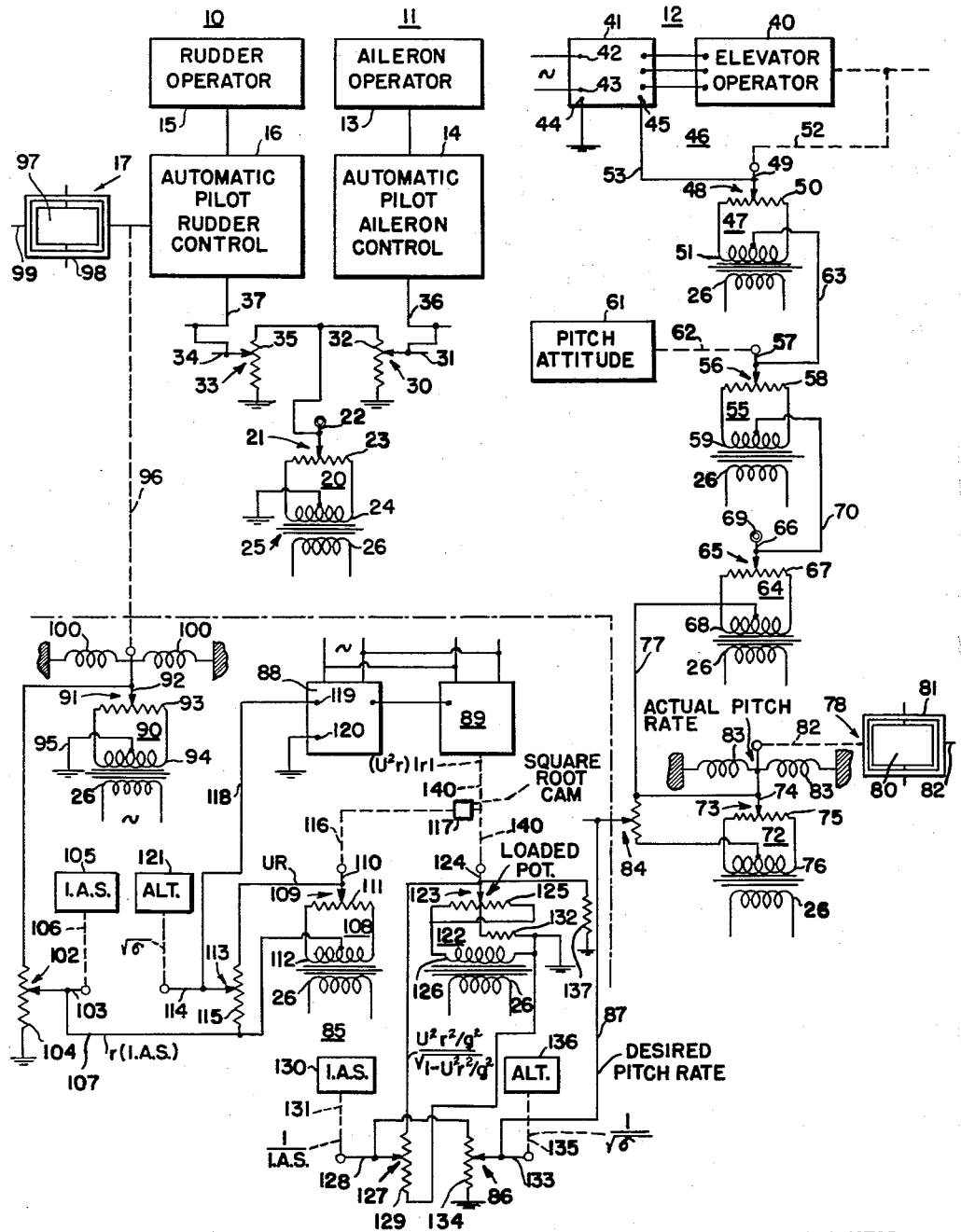

Oct. 11, 1960   H. D. ECKHARDT   2,955,783
AUTOMATIC PILOT FOR AIRCRAFT
Filed Aug. 24, 1953   2 Sheets-Sheet 1

INVENTOR.
HOMER D. ECKHARDT
BY George H. Fisher
ATTORNEY

Oct. 11, 1960 H. D. ECKHARDT 2,955,783
AUTOMATIC PILOT FOR AIRCRAFT
Filed Aug. 24, 1953 2 Sheets-Sheet 2

COMPARISON OF CURVE OF TAN. $\phi$ WITH CURVE OF $\frac{x}{\sqrt{1-x}}$

INVENTOR.
HOMER D. ECKHARDT
BY
*George H Fisher*

ATTORNEY

United States Patent Office 2,955,783
Patented Oct. 11, 1960

2,955,783

AUTOMATIC PILOT FOR AIRCRAFT

Homer D. Eckhardt, Binghamton, N.Y., assignor to Minneapolis-Honeywell Regulator Company, Minneapolis, Minn., a corporation of Delaware Filed Aug. 24, 1953, Ser. No. 376,031

9 Claims. (Cl. 244—77)

This invention pertains to automatic pilots for dirigible craft such as aircraft for maintaining a condition such as the craft altitude at a predetermined value while the craft is in a banked turn by supplying control signals that operate a servomotor that positions the elevator surface of the aircraft.

A desirable feature of an automatic pilot is that it will control the aircraft in curved flight as in a banked turn such that the altitude of the craft will be substantially maintained during such banked turn. The altitude of the craft may be maintained during the banked turn by operation of the elevator control surface of the craft. Heretofore, in one configuration of the automatic pilot, operation of the elevator control surface to maintain altitude in a banked turn has been made responsive to the operation of a vertical gyroscope as it detects the change in roll attitude of the craft. Such an arrangement is disclosed in the patent to Kutzler et al., 2,471,821, issued May 31, 1949, or that to Kutzler, 2,525,038, issued October 10, 1950.

An object of this invention is to provide an improved control system for an aircraft which automatically maintains substantially constant altitude of the aircraft during banked turns.

Another object of this invention is to compute a desired pitch rate of the craft and oppose it by the apparent pitch rate obtained from the actual pitch rate response of a rate gyroscope having its rotor spin axis in the direction of the craft roll axis and its precession axis in the direction of the craft turn or vertical axis to control the elevator surface to maintain altitude of the craft in a banked turn.

Further objects of the invention will appear upon consideration of the following description taken in conjunction with the accompanying drawing disclosing a preferred embodiment thereof.

My invention has its application herein in a three control axis automatic pilot having ailerons, rudder, and elevator control surfaces. In this automatic pilot the ailerons and rudder as conventional are operated to place the craft in a banked turn. The automatic pilot includes a rate gyroscope responsive to rate of movement of the craft about its vertical axis and a rate gyroscope responsive to rate of angular movements of the craft about its pitch axis. When the craft is in the banked turn whereby it encircles an axis in space which passes through the center of the earth the yaw rate gyroscope and the pitch rate gyroscope, due to the bank attitude of the craft, precess as the craft turns about a point in space. The extent of precession of the yaw rate gyroscope depends upon the rate of turn about the point in space multiplied by the cosine of the angle of bank attitude and the extent of precession of the pitch rate gyroscope depends upon the angular rate of the craft about the point in space multiplied by the sine of the angle of bank attitude of the craft. A desired pitch rate signal is computed from the responsive yaw rate gyroscope and this signal is opposed to the apparent pitch rate signal derived from the response of the pitch rate gyroscope and the two signals in combination control the operation of the elevator surface to maintain constant the altitude of the craft while in the banked turn.

Figure 2:
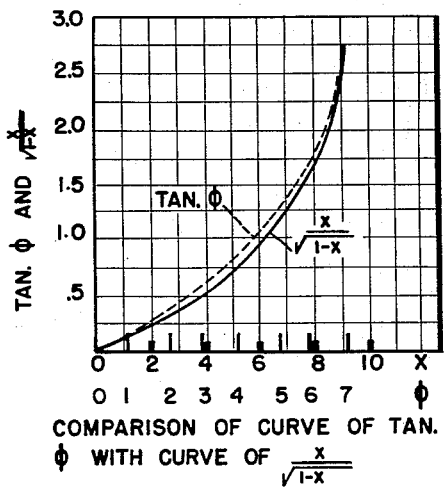
Figure 3:
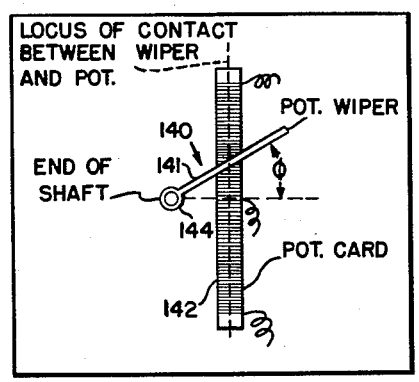

The invention may be more fully understood by a consideration of the following detailed description thereof in connection with the accompanying schematic drawings showing an automatic pilot embodying the same, wherein Figure 1 is a schematic arrangement of an entire control apparatus, Figure 2 is a graph of a derived variable utilizing the apparatus of Figure 1, and Figure 3 is a modification of a subassembly of Figure 1.

Referring to the drawing, the automatic pilot includes rudder channel 10, aileron channel 11, and elevator channel 12 for controlling the angular movements of the craft about its vertical or turn, roll, and lateral or pitch axes respectively. The aileron surfaces are positioned by an aileron operator 13 which is reversibly controlled by a balanceable automatic control apparatus 14. The rudder surface is positioned by a rudder operator 15 which in turn is reversibly controlled by a balanceable automatic rudder control system 16. The two control systems may consist of balanceable potentiometer networks. The rudder control apparatus 16 includes a potentiometer operated by a device such as a yaw rate gyroscope 17 responsive to rate of craft angular movement about its vertical axis. Such rate gyroscope operated potentiometer is disclosed in Kutzler patent, 2,561,873, issued July 24, 1951.

Manually initiated banked turns of the craft through the two balanceable control systems is effected by a manually operable turn control signal generator 20, an aileron channel turn control voltage selector 30, and a rudder channel turn control voltage selector 33. The signal generator 20 comprises a turn control potentiometer 21 having a slider 22 and resistor 23. The resistor 23 is connected across a secondary winding 24 of a transformer 25 having a primary winding 26. The slider 22 is manually positioned along resistor 23 in either direction from the electrical center thereof. The aileron selector 30 is a voltage divider having a resistor 32 which is connected across a grounded center tap of secondary winding 24 and slider 22. The voltage divider includes an adjustable tap 31 for selecting any desired portion of a voltage developed between slider 22 and ground on displacement of slider 22 from its center position with respect to the potential of the center tap of secondary winding 24. A conductor 36 connects slider 31 to the aileron control system 14. The rudder selector 33 is a voltage dividing potentiometer having a resistor 35 connected across slider 22 and the grounded center tap of transformer secondary winding 24. The voltage divider includes an adjustable tap 34 from which extends a conductor 37 connected to the rudder control system. It will thus be apparent that upon movement of slider 22 relative to the center of resistor 23, a voltage is developed in the signal generator 20 and the ratio of the voltage developed and supplied respectively by conductors 36 and 37 to the aileron and rudder control systems depends upon the adjustments of the taps 31 and 34. The aileron and rudder control channels as thus described may be similar to the corresponding channels in the patent to Kutzler et al., 2,471,821 with the slight variation in the rudder channel due to the inclusion of the yaw rate gyroscope.

The elevator surface is positioned by an elevator operator 40 or further means comprising an electrical motor which is reversibly controlled from an elevator servomotor amplifier 41. The elevator amplifier 41 is of the alternating voltage discriminator type having alternating voltage power input connections 42, 43, and alternating voltage control signal input terminals 44, 45. Depending upon the instantaneous phase relationship of the control signal voltage to the input power voltage, the motor 40 operates in one or the other direction. The amplifier servomotor combination in the elevator channel may be similar to that used in the rudder and aileron channels and the combination is more fully disclosed in the patent to Willis H. Gille, No. 2,425,734.

Control signals are applied across the elevator channel amplifier terminals 44, 45 from a balanceable variable impedance network 46. Network 46 comprises various signal producing means such as a follow-up signal voltage generator 47, a pitch attitude signal generator 55, a trim signal generator 64, a craft pitch rate responsive signal generator 72, and a rather complex desired pitch rate response signal generator 85. The control circuit may be traced from amplifier terminal 45, conductor 53, slider 49, a center tap of secondary winding 51, conductor 63, slider 57, a center tap of secondary winding 59, conductor 70, slider 66, a center tap of secondary winding 68, conductor 77, voltage divider 84, conductor 87, voltage dividing potentiometer 86 to ground, and to amplifier ground terminal 44. Signal generator 47 comprises a follow-up potentiometer 48 having a slider 49 and resistor 50 and a secondary winding 51 of the transformer 25 having a multiple of secondary windings energized from a single primary winding 26. Resistor 50 is connected across the ends of secondary winding 51. Slider 49 is positioned along resistor 50 in either direction from the electrical center thereof in accordance with the extent of operation of the elevator servomotor 40 by a suitable operating means 52 extending therefrom. The conductor 53 connects slider 49 with amplifier terminal 45. Signal generator 55 comprises a pitch attitude potentiometer 56 having a slider 57 and resistor 58 which is connected across a secondary winding 59 of the transformer. Slider 57 is positioned along resistor 58 by a suitable operating means 62 connecting slider 57 with a pitch attitude detector 61. Conductor 63 connects slider 57 to the center tap of secondary winding 51. Signal generator 64 comprises a trim potentiometer 65 having a slider 66 and resistor 67 which is connected across the secondary winding 68 of the transformer. Slider 66 may be positioned along resistor 67 by a manually operable knob 69. Conductor 70 connects slider 66 with the center tap of secondary winding 59. The signal generator 72 comprises a craft pitch rate gyroscope potentiometer 73 having a slider 74 and resistor 75 which is connected across a secondary winding 76 of the transformer. The slider 74 is positioned along resistor 75 in either direction from the electrical center thereof by an operating connection 82 connecting it with a craft pitch rate device such as gyroscope 78. The gyroscope 78 is of the conventional type having a rotor 80 supported about a normally horizontal spin axis in an outer frame 81. The frame 81 in turn has an axis which is positioned on the craft in the direction of the vertical axis thereof. Springs 83 between the slider 74 and the craft limit the movement of slider 74 in proportion to the pitch rate of the craft about its lateral axis. The signal generator includes a voltage divider 84 with its resistor connected across slider 74 and a center tap of secondary winding 76 to select any desired portion of the voltage between slider 74 and the center tap. A conductor 77 connects one end of the resistor of the voltage divider to the center tap of secondary winding 68.

The complex signal generator 85 which computes the desired pitch rate response signal of the craft from the response of the yaw rate gyroscope 17 has a construction which is dependent upon mathematical expressions which will be developed prior to discussing the physical aspects of the signal generator 85.

In a steady, coordinated constant altitude banked turn i.e. one without sideslip or skid, the response of the yaw rate gyroscope 17 is such that the reading thereof is equal to the actual rate of turn in space of the craft about an axis which passes through the center of the earth multiplied by the cosine of the angle of the bank of the craft. Similarly the response of the pitch rate gyroscope 78 is such that it provides a signal proportional to the rate of turn of the craft about the axis in space multiplied by the sine of the angle of bank of the craft. If we solve these two equations in a manner such as to eliminate the rate of turn of the craft about the point in space we have the following relationship:

(1) $$\frac{q}{r} = \tan \text{ of } \phi$$

where $q$ equals the craft pitch rate and $r$ equals the craft yaw rate about its vertical axis.

Where the turn is coordinated, that is, there is no sideslip nor skid the following relationship holds (2) $$\frac{Ur}{g} = \sin \text{ of } \phi$$

where the factor $U$ is the true airspeed of the craft in feet per second, $g$ equals the acceleration due to gravity, and $\phi$ equals the bank angle.

If the airplane is flying a coordinated turn, then to cause it to fly at constant altitude in this turn we must control its motions so that they satisfy Equations 1 and 2. We may eliminate $\phi$ from Equations 1 and 2 by noting the relationships shown in Equation 3.

(3) $$\tan \phi = \frac{\sin \phi}{\cos \phi} = \frac{\sin \phi}{\sqrt{1-\sin^2 \phi}} = \frac{\frac{Ur}{g}}{\sqrt{1-\frac{U^2 r^2}{g^2}}}$$

Combining Equations 1 and 3 we obtain Equation 4.

(4) $$Uq = g\left(\frac{\frac{U^2 r^2}{g^2}}{\sqrt{1-\frac{U^2 r^2}{g^2}}}\right)$$

It is apparent from Equation 4 that we may calculate a pitch rate ($q$) from the true airspeed of the craft and the operation of the yaw rate gyroscope, namely the quantities $U$ and $r$. The calculated pitch rate may be opposed by the actual pitch rate as determined by the operation of the pitch rate gyroscope 78 to correct the position of the elevator to maintain constant the altitude of the craft in the banked turn. The signal generator 85 embodies the structure of a computer means for solving Equation 4.

The signal generator 85 as indicated has its output signal supplied by voltage divider 86. The signal generator 85 effects the computation of the desired pitch rate signal by controlling an amplifier 88 and a motor 89 in accordance with the rate of yaw of the craft and the correct airspeed of the craft. The amplifier 88 may be of the A.C. discriminator type which reversibly operates motor 89 in accordance with the phase relationship of an alternating voltage control signal to the amplifier 88 relative to an alternating power input voltage supplied thereto. The motor 89 may be a capacitor type induction motor having one phase winding energized from the alternating voltage power supply and its other winding energized from the output of the amplifier 88. The amplifier 88 includes a control circuit which is unbalanced by signals provided by a craft yaw rate signal generator 90 as modified by an indicated airspeed (IAS) voltage divider 102 and is rebalanced by a motor driven follow-up signal generator 108 including an altitude or air density correction factor sigma ($\sigma$) from voltage divider 113. The signal circuit extends from amplifier terminal 119, conductor 118, slider 114, resistor 115, conductor 107, slider 103, resistor 104 to ground and to amplifier ground terminal 120. The signal generator 90 comprises a yaw rate potentiometer 91 having a slider 92 and resistor 93 which is connected across a secondary winding 94 of the transformer. A ground conductor 95 extends from a center tap of secondary winding 94. Slider 92 is positioned along resistor 93 in either direction from the electrical center thereof by an operating means 96 connecting it with the craft yaw rate gyroscope 17. The gyroscope 17 comprises a rotor 97 having its spin axis supported in a frame 98. The frame 98 in turn has a precession axis 99 of the gyroscope supported in the direction of the lateral axis of the aircraft so that upon movement of the craft about its vertical or yaw axis the gyroscope will precess. Precession of the gyroscope about axis 99 is resisted by centering springs 100 connected between slider 92 and a fixed part of the craft in conventional manner. The rate of yaw of the craft ($r$) is proportional to the voltage appearing between slider 92 and the center tap of secondary winding 94. Voltage divider 102 comprises a slider 103 and a resistor 104 which is connected across slider 92 and the ground center tap of winding 94. Slider 103 is positioned by an indicated airspeed device 105 of known type by suitable operating means 106 connecting slider 103 therewith. The voltage appearing between slider 103 and ground is thus made to be proportional to the product of the craft yaw rate ($r$) and the craft indicated airspeed (IAS). The signal generator 108 comprises a rebalancing potentiometer 109 having a slider 110 and resistor 111 which is connected across a secondary winding 112 of the transformer. Slider 110 is positioned along resistor 111 in either direction from the electrical center thereof by an operating connection 116 connecting it with a square root cam 117 driven by the motor 89. By operating slider 110 of the follow-up potentiometer in accordance with the square root of the rotation of motor 89 it is apparent that we may obtain a rotation of motor 89, the absolute value of which rotation is closely proportional to the square of the voltage appearing between slider 103 and ground. The voltage divider 113 comprises a slider 114 and resistor 115 which is connected across the slider 110 and a center tap of secondary winding 112. The slider 114 is operated by an altitude responsive device 121 to apply the density correction ($\sigma$) to the computation. While the density correction for converting indicated airspeed (IAS) to true airspeed could have been applied to the voltage developed between slider 103 and ground it has been utilized in this illustration in the feedback path of the amplifier 88 where it effects a division rather than a multiplication operation. A conductor 107 connects the center tap of secondary winding 112 to slider 103 and a conductor 118 connects slider 114 to amplifier signal input terminal 119.

It will now be apparent that the rotation of motor 89 is proportional to the product of $U^2r$ times the absolute value of $r$. That is to say, the absolute value of the motor rotation is proportional to the absolute value of $U^2r^2$ and its direction is determined by the algebraic sign of $r$. The operation of motor 89 is also applied to a signal generator 122 to provide an output voltage proportional to $$\frac{\frac{U^2r^2}{g^2}}{\sqrt{1-\frac{U^2r^2}{g^2}}}$$

It will be noted that this expression is of the form $$\frac{x}{\sqrt{1-x}} \text{ where } x=\frac{U^2r^2}{g^2}$$

The effect on the pitch rate gyroscope 78 when in a steady, constant altitude, banked turn is such that the slider 74 operated thereby is displaced in the same direction irrespective of the direction in which the banked turn is made; therefore, the signal from the generator 72 due to the banked turn effect on the rate gyroscope 78 is unidirectional. Consequently, the signal derived from the generator 122 which is to oppose the actual pitch rate signal from generator 72 must also be unidirectional. To this end the signal generator 122 comprises a potentiometer 123 having a slider 124 and resistor 125. The generator 122 includes a secondary winding 126 of a transformer having one end thereof connected to the two ends of resistor 125 and its opposite end connected through a resistor 132 to a center tap of resistor 125, thus irrespective of the direction of movement of slider 124 from the resistor center tap a signal voltage of constant phase is provided. Slider 124 is positioned along resistor 125 by the motor 89 through the operating means 140.

While various constructions may be utilized to provide an output voltage from signal generator 122 proportional to $$\frac{\frac{U^2r^2}{g^2}}{\sqrt{1-\frac{U^2r^2}{g^2}}}$$

the function is broadly provided by a loading resistor 137 extending from the slider 124 to ground. The signal output from generator 122 is divided by the quantity U in Equation 4 to provide the desired craft pitch rate. To this end, the voltage from generator 122 is applied across a voltage divider 127 comprising a slider 128 and resistor 129. Resistor 129 is connected between the slider 124 and the junction of secondary winding 126 and resistor 132 which in turn is connected to ground. The slider 128 is operated along resistor 129 inversely proportional to the indicated airspeed of the craft. The slider has its operating connection 131 extending from the indicated airspeed responsive device 130 to produce the movement $$\frac{1}{\text{IAS}}$$

The output from the voltage divider 127 is derived between slider 128 and the grounded end of secondary winding 126. Across these two points is placed a resistor 134 of the voltage divider 86 which has a slider 133 having an operating connection 135 therefor connecting it with an altitude responsive device 136. The slider 133 is positioned along resistor 134 to convert the indicated airspeed factor to a true airspeed factor and therefore slider 133 has a movement which is approximately proportional to $$\frac{1}{\sqrt{\sigma}}$$

or approximately inversely proportional to the square root of the density of the air at the altitude involved relative to the density of the air at sea level for standard conditions. Thus the signal voltage appearing between slider 133 and the grounded end of resistor 134 is the computed or desired pitch rate response due to the banked turn of the craft which voltage is placed in series opposition to the signal from voltage generator 72 operated by gyroscope 78 in network 46.

In operation, the aircraft may be stabilized about its three axes respectively by the aileron control 14, the rudder control 16, and the elevator control 46. If it be desired to place the craft in a banked turn the manually operable turn control slider 22 is displaced to unbalance the aileron and rudder control systems whereby the aileron and rudder surfaces are operated to place the craft in a banked turn. As the craft is in the banked turn, the pitch rate gyroscope responds in a manner as if the nose of the aircraft were moving upward about the lateral axis. The pitch rate gyroscope would operate the signal generator 72 to provide a signal which would effect operation of the elevator servomotor 40 in such a direction as to place the elevator surface in a down position from normal. The yaw rate gyroscope 17 on the other hand in response to the banked turn of the craft and through the signal generator 85 provides a signal from voltage dividing potentiometer 86 tending to place an up elevator signal in network 46 opposing that derived from the pitch rate signal generator 72. Thus under the prescribed condition from which the derived pitch rate response signal is computed, i.e. with the craft having no slip or skid, the craft altitude is maintained substantially constant in the banked turn by the opposing signals from voltage divider 86 and voltage generator 72.

Figure 2 shows a chart of the function $$\frac{x}{\sqrt{1-x}}$$

where $x$ is the quantity $$\frac{U^2 r^2}{g^2}$$

A graph of this function is compared to a graph of the function tangent $\phi$ where $\phi$ is an angle. It can be seen that there is very little percentage difference between the two curves. The computation of tangent $\phi$ and thus of $$\frac{x}{\sqrt{1-x}}$$

can be accomplished by means of a potentiometer of the form shown in Figure 3. In the arrangement of Figure 3, a potentiometer 140 comprises a wiper 141 and a resistor 142. The slider is rotated about an axis 144 which is normal to the plane of the diagram. The longitudinal axis of the resistor 142 is at right angles to the slider 141 when the latter is at its normal centered position. The contact point of the slider 141 and resistor 142 moves radially outward along the slider as the slider is rotated about its pivot. The angle of rotation of the slider 141 is not the bank angle of the aircraft but merely denotes an angular movement $\phi$ corresponding with a given value of the quantity $x$. We may drive the slider 141 by the output shaft 140 of the motor 89. The value of the voltage between the slider contact point and the midpoint of the resistor as indicated varies as the tangent of the angle through which the slider 141 has been rotated. It is understood, that the resistor winding 142 has been grounded at its center and has been energized at both ends from one end of a secondary winding of the transformer. The value of the voltage proportional to the tangent of the angle of rotation of slider 141 as indicated in respect to Figure 2 is a very close approximation to the value $$\frac{x}{\sqrt{1-x}}$$

The arrangement of Figure 3 may be used in signal generator 122 of Figure 1 instead of the loaded potentiometer 123.

From the above description of my invention, it will now be appreciated that I have provided an effective means automatically operative during banked turns of the aircraft for operating the elevator surface to substantially maintain the altitude of the aircraft while in such turn and while one form of the invention has been disclosed other embodiments thereof will suggest themselves. Thus the invention is not to be confined to the specific form disclosed but as defined by the following claims.

What is claimed is:

1. In an automatic pilot for a dirigible craft having an elevator surface for controlling the craft about its lateral axis, in combination: means for banking and turning said craft about an axis through the center of the earth; a yaw rate gyroscope for developing a signal proportional to the rate of turn of the craft about the turn axis modified by the cosine of the angle of bank; means controlled by said yaw rate gyroscope signal for deriving a desired-pitch-rate signal; a pitch rate gyroscope responsive to the rate of pitch of the craft about its lateral axis said response when the craft is in a banked turn being proportional to the rate of turn about the turn axis modified by the sine of the bank angle; and means for opposing the desired pitch rate signal with the actual rate signal derived from the pitch rate gyroscope; and means controlled from said combining means for operating the elevator surface.

2. In control apparatus for an aircraft having banked turn controlling means, in combination: an airspeed responsive device; a yaw rate gyroscope having its precession axis parallel to the lateral axis of the craft; a pitch rate gyroscope having its precession axis parallel to the vertical axis of the craft; a first signal providing computer means operated by said yaw rate gyroscope and airspeed device and providing a unidirectional signal indicative of a desired pitch rate irrespective of the direction of the craft banked turn; a second means operated by said pitch rate gyroscope and providing a signal dependent on the algebraic sum of both the apparent unidirectional pitch rate of the craft about its lateral axis while in a banked turn due to loss of parallelism of the lateral axis and the earth's surface and the angular movement of the craft about said lateral axis; and further means controlled by said first and second signal providing means controlling the attitude of the craft about its lateral axis.

3. In control apparatus for an aircraft having banked turn providing means, in combination: a yaw rate gyroscope having its precessional axis continuously parallel to the lateral axis of the craft; a pitch rate gyroscope having its precessional axis continuously parallel to the vertical axis of the craft; airspeed responsive means; a first means operated by said yaw rate gyroscope and airspeed responsive means and providing a unidirectional signal indicative of a desired pitch rate irrespective of the direction of craft banked turn; a second means operated by said pitch rate gyroscope and providing a signal dependent on the algebraic sum of both the apparent unidirectional pitch rate of the craft about its lateral axis while in a banked turn due to loss of parallelism of the lateral axis and the earth's surface and the actual pitch rate of the craft of a polarity dependent upon the direction of angular movement of the craft about said lateral axis; and further means connected to said first and second means and operated in accordance with the difference of the two signals.

4. In flight control apparatus for an aircraft, means for obtaining the pitch rate of the craft about its lateral axis indicative of changes in altitude while in a banked turn comprising: a yaw rate gyroscope responsive to angular rate of the craft about its normally vertical axis; a pitch rate gyroscope responsive to angular rate of the craft about its lateral axis; a first means comprising a signal producing means operated by said yaw rate gyroscope, said first means providing a unidirectional desired pitch rate signal irrespective of the direction of craft banked turn; a second signal producing means operated by said pitch rate gyroscope providing a signal dependent upon the algebraic sum of both the apparent unidirectional pitch rate of the craft while in the banked turn about its lateral axis due to loss of parallelism of the lateral axis and the earth's surface and the variable polarity pitch rate of the craft due to movement thereof about its lateral axis; and means responsive to difference of the signals from said first and second means.

5. In an automatic pilot for an aircraft having control surfaces for controlling the craft about its roll axis and vertical axis and a control surface for controlling craft attitude about its pitch axis, in combination: heading control apparatus for positioning said aileron and rudder surfaces to place said craft in a banked turn, a rate gyroscope having its precession axis in the direction of the craft lateral axis and responsive to rate of turn of the craft about its normally vertical axis; computer means comprising means controlled by said gyroscope for computing a unidirectional signal proportional to the desired pitch rate of the craft about the craft lateral axis, a rate gyroscope having its precession axis in the direction of the normally vertical axis of the craft and responsive to the pitch rate of the craft for deriving a signal proportional to the apparent pitch rate thereof; means for opposing the desired pitch rate signal and the apparent pitch rate signal and obtaining the difference of said signals; and means controlled by the difference of said signals for operating the elevator surface to prevent loss of altitude of the craft in the banked turn.

6. In control apparatus for a dirigible craft having control surfaces for controlling movements of said craft about its vertical, longitudinal, and lateral axes, in combination: means for operating the control surfaces for controlling the attitude about its longitudinal axis and said turn axis to place said craft in a banked turn; a first device responsive to the rate of turn ($r$) of the craft about the axis of turning modified by the cosine of the bank angle; computer means responsive to the first device and providing a unidirectional output in accordance with the expression $$\left(\frac{U^2r^2/g^2}{\sqrt{1-U^2r^2/g^2}}\right)g$$

wherein additionally U is the airspeed of the craft and $g$ is the acceleration equal to the acceleration of gravity; a second device responsive to the rate of motion of the craft about the axis of turn modified by the sine of the angle of bank; and means controlled by said means and second device in opposing relation for operating the control surface for altering the craft's pitch attitude to substantially maintain the altitude of the craft in the banked turn.

7. In a control apparatus for a dirigible craft movable about an axis in space which passes through the center of the earth, in combination: a first rate signal providing means for controlling movement of said craft about the craft lateral axis; a second rate signal providing means for controlling movement of the craft about a craft vertical axis; selective means for tilting said craft about the craft longitudinal axis to effect a turn of said craft about the said axis in space; air speed responsive means; altitude responsive means; computer means controlled by said second rate signal providing means, said air speed responsive means, and altitude responsive means and providing a unidirectional, desired pitch rate signal for the air speed and altitude of the craft; further means controlled by said first signal providing means and by said unidirectional signal during movement of said craft about said axis in space while tilted, for controlling the movement of the craft about its lateral axis to prevent loss in altitude of said craft.

8. In an automatic pilot for an aircraft having aileron and rudder control surfaces, in combination: aileron power means, rudder power means, a single control means including means for setting in a desired angle of bank and rudder operation to place said craft in a banked turn, a first rate gyroscope having its precession axis of the aircraft and responsive to movement of the craft about its vertical axis, a pitch rate gyroscope having its rotor spin axis in the direction of the aircraft roll axis and responsive to movements of said craft about its lateral axis, air speed responsive means, computer means controlled by said first rate gyroscope and air speed responsive means and providing a unidirectional response indicative of a desired pitch rate for the air speed, further means connected to both said pitch rate gyroscope and computer means and controlled by the response of said gyroscope and computer means while said craft is in a banked turn controlling the movement of the craft about its lateral axis.

9. In control apparatus for a dirigible craft having means for tilting said craft about its longitudinal axis and thereby placing said craft in a banked turn, in combination: a first rate gyroscope responsive to rate of movement ($q$) of the craft about its lateral or pitch axis; a second rate gyroscope responsive to rate of movement ($r$) of the craft about its turn axis; means responsive to the air speed (U) of the craft; computer operated by said second rate gyroscope and said air speed responsive means and providing a desired pitch rate ($q$) in terms of the expression $$\left(\frac{U^2r^2/g^2}{\sqrt{1-U^2r^2/g^2}}\right)g$$

wherein $g$ is an acceleration equal to the acceleration of gravity; voltage signal producing means operated by said first rate gyroscope and said computer while the craft is in the banked turn; and means controlling movement of the craft about its lateral or pitch axis and connected to said voltage signal producing means, the operation of said second rate gyroscope and air speed device through said computer on said signal producing means compensating for the unidirectional apparent pitch rate of the craft irrespective of the direction of banked turn due to loss of parallelism of the lateral axis and the earth surface.

References Cited in the file of this patent

UNITED STATES PATENTS

| | | |
|---|---|---|
| 2,415,430 | Frische | Feb. 11, 1947 |
| 2,443,748 | Sanders | June 22, 1948 |
| 2,567,922 | Brannin et al. | Sept. 18, 1951 |
| 2,585,162 | Noxon | Feb. 12, 1952 |
| 2,620,149 | Strother | Dec. 2, 1952 |
| 2,649,264 | Slater et al. | Aug. 18, 1953 |
| 2,801,816 | Meredith | Aug. 6, 1957 |